INVENTORS
Melvin J. Straub
Thomas L. Schuette
BY
ATTORNEY

United States Patent Office 3,755,523
Patented Aug. 28, 1973

3,755,523
METHOD FOR APPLYING EXTRUDED PLASTIC FILMS TO SUBSTRATES
Melvin J. Straub, Minnetonka, and Thomas L. Schuette, Osseo, Minn., assignors to Possis Corporation, Minneapolis, Minn.
Original application July 18, 1969, Ser. No. 842,991, now Patent No. 3,596,432, dated Aug. 3, 1971. Divided and this application Mar. 1, 1971, Ser. No. 119,568
Int. Cl. B29c 17/04; B29d 7/04
U.S. Cl. 264—90                                    3 Claims

ABSTRACT OF THE DISCLOSURE

A packaging method wherein a web of paperboard is continuously drawn along a defined path, under a loading device by which articles or products to be packaged are successively deposited upon the web to be carried thereby through a curtain or sheet of molten thermoplastic resin which debouches from a downwardly opening nozzle, to lay itself onto and form a covering film on the web and over any articles or products thereon. The mouth of the nozzle is a slit which extends transversely across the path of the web and is arched to have its ends close to the web while its mid-portion is spaced much farther from the web. The film covered web then travels across a vacuum chamber by which any space between the covering film and the web is evacuated and the film drawn tightly over the articles or products and against the web. A series of closely spaced parallel rollers across the top of the vacuum chamber with their axes transverse to the web supports the web, and certain of the rollers are driven to draw the web through the machine. Beyond the vacuum chamber, the web with the covered articles or products thereon enters a guillotine type cutoff station where it is cut into discrete units each of which is a complete package.

This invention, like that of the copending application Ser. No. 842,991, filed July 18, 1969, now Pat. No. 3,596,-432, of which this is a division, relates to a method for packaging articles by the so-called "skin packaging" technique.

There are two ways in which skin packaging has been practiced. In one, a thermoplastic sheet—usually transparent—after being heated to soften it, is draped over the article which has been placed upon an air pervious panel, such as a piece of cardboard and then by means of suction applied to the underside of the panel, the thermoplastic sheet is drawn down over the article and into firm engagement with the top of the panel.

To assure good adhesion between the panel and those portions of the thermoplastic sheet in contact therewith, it is customary to coat the panel surface or seleced areas thereof with a coating which has an affinity for the material of which the thermoplastic sheet is made. The Groth Pat. No. 2,855,735 and the Grinrod et al. Pat. No. 3,228,-168 are examples of this skin packaging method.

The other approach to skin packaging is an outgrowth of curtain enrobing, wherein articles to be enrobed are carried through a falling curtain of the coating or enrobing material. This packaging method is described in an article which appeared in the May, 1965 issue of Modern Packaging, under the heading "Skin Pack That Flows On." As explained in that article, the curtain is molten thermoplastic resin extruded from a nozzle and deposited onto the article to be packaged and the surrounding surface of the card on which it is placed. As the flowing thermoplastic material contacts the article and its carrying card, it solidifies and forms the desired covering film; and, again, as in the other method, suction applied to the underside of the card draws the covering film tightly about the article and onto the card.

The present invention also uses an extruded molten thermoplastic film and, in a general way, produces packages in the manner described in the Modern Packaging article, but does so far more efficiently.

To gain the utmost efficiency and speed, the machine utilized in the method of this invention operates in a continuous manner. To that end, the articles or products to be packaged are sequentially deposited upon a traveling substrate which may be a web of paperboard drawn from a roll, to be carried thereby through the descending curtain or sheet of liquid thermoplastic material and covered by the thermoplastic film which forms as the molten material contacts the web and the articles thereon. Directly downstream from the nozzle by which the curtain is formed, the machine has an upwardly opening suction nozzle or vacuum chamber across which the web passes. As it does, any space between the web and the covering thermoplastic film is evacuated, causing the covering film to be drawn tightly over the article and against the web, it being understood that the web is either inherently air permeable or specially made so.

The traveling web with the now covered articles thereon next passes through a cutting station where a "flying guillotine" severs the web into individual packages.

In the development of the machine utilized in the method of this invention, it was observed that the phenomenon known as "necking"—which is a convergent narrowing of the width of the curtain debouching from the nozzle, and which in the past was thought to be inescapable—caused the side edges of the ribbon of film laid onto the web to take a very irregular shape. To eliminate this unsightly result, it would be necessary to trim off the side edge portions of the finished packages, which of course would crease waste and take time, unless some way of preventing necking could be found. This has been accomplished by the present invention.

As will be more fully explained hereinafter, one of the features of this invention stems from the discovery that if the elongated nozzle orifice from which the certain of molten thermoplastic material issues, is arched or concave in its lengthwise dimension so that the end of the nozzle can be brought close to the side portions of the web while its middle is spaced far enough above the web to accommodate the articles or products being carried through the curtain issuing from the nozzle, the side edges of the applied film are straight and can be held directly contiguous to the edges of the substrate web.

But with the solution of the necking problem, another difficulty was encountered. The medial portion of the applied film did not lie flat along the length of the web, even when the web was devoid of articles or products, but instead was doubled or piled up on itself at spaced intervals. This objectionable condition known as "cascading" results from the wavering that is characteristic of a falling sheet or curtain of liquid resin. Because of it, the deposited material folds back and forth upon itself, unless the advance of the surface onto which the curtain is deposited and the velocity of the falling curtain are correctly coordinated. If the distance between the web and all portions of the nozzle orifice is uniform—which of course requires that the nozzle be straight—adjustment of the web speed is the easiest way of gaining needed coordination. But the concave or arched nozzle shape rules out this obvious solution to the cascading problem.

Because of the arched shape of the nozzle, the distance the curtain drops or travels before it impinges upon the surface being coated is not uniform. It falls farther at the middle than it does at the side edges of the curtain, and because it falls farther, its velocity at the moment of impact with the web—due to gravitational acceleration—is faster than it is at the side edges. Hence, with the web speed correct for proper deposition of the film at the side edges, which is essential to the attainment of a neat package, it is too slow for proper deposition at the middle and this causes the objectionable cascading.

The elimination of this objectionable cascading which resulted from the use of the arched or concave nozzle is another object of this invention. Its attainment, broadly stated, resides in so governing or controlling the velocity of the material issuing from the nozzle that the material leaves the medial portion of the nozzle at a slower rate than it does at the ends of the nozzle. There are different ways of accomplishing this result and alternatives readily suggested themselves once it was discovered what caused the cascading and why the problem could not be corrected by simply adjusting the speed of web travel.

Another feature of this invention resides in the design of the vacuum chamber or suction nozzle, and especially in the fact that as the web passes across its mouth, it is supported on a series of parallel closely spaced rollers, certain of which are driven to draw the web through the machine.

The machine utilized in the method of this invention lends itself well to the incorporation of optional features for special treatment of the substrate. For instance, as the web-substrate is drawn off the supply roll, it can be passed under a perforating roll by which a multiplicity of tiny perforations can be formed in the web to render an otherwise imperforate substrate air permeable. Also, by means of an appropriately located coating roller, a seal coat can be applied to the underside of the web after the covering film has been drawn down onto the articles or products. Die cutting of the web before the articles or products are loaded onto it, to provide means to facilitate opening the finished packages can be incorporated, or for the same purpose a tear strip or cord can be introduced between the substrate and the covering film as the packages are being formed.

With these observations and objects in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate several complete examples of the embodiment of the invention constructed according to the best modes so far divised for the practical application of the principles thereof, and in which.

THE MACHINE GENERALLY

Referring to the accompanying drawings, the numeral 3 designates the general frame structure of a packaging machine embodying this invention. The frame supports a table 4 over which a web 5 of paperboard may be drawn from a supply roll 6 suitably mounted at the loading end of the machine where an idler roll 7 guides the web onto the table. The web provides the substrate for the packages to be produced.

As the web travels along the table 4 it first passes under a loading chute 8 down which the articles or products to be packaged slide to be deposited on the web in regularly spaced sequence. The timing of their placement and the spacing of the articles or products on the web is controlled by a pair of pneumatically actuated plungers 9 and 10, the alternate actuation of which allows the articles or products to drop one at a time, at the right instant, from the bottom of the chute onto the web.

Downstream of the loading station the web passes under a nozzle 11 from which a curtain or sheet S of molten thermoplastic material debouches to lay itself onto the passing web and the articles or products thereon. As it does so, it congeals or solidifies and forms a film which covers the entire top surface of the web and, of course, any articles or products thereon. The thermoplastic material employed may be any one of several which lend themselves to the "skin packaging" technique. The useable materials are characterized by high molecular weight and a viscosity in excess of 20,000 centipoises in the molten condition. Included among such materials are polyolefins, cellulose esters, vinyl polymers, and the like. Among the preferred materials are cellulose acetate butyrate and cellulose acetate propionate because of their ease of handling and ability to produce a clear transparent film which greatly enhances the appearance of the finished package.

The table is interrupted beneath the nozzle 11 so that during warm-up periods before the web has been fed into the machine, or when for some reason or other no substrate is present under the nozzle, the molten resin extruded from the nozzle can drop into a melt tank or pot 12 located below the table level. Directly after passing under the nozzle 11, the coated web crosses a vacuum chamber or suction nozzle 13, the mouth of which faces upwardly and is wide enough to encompass the full width of the web. To enable subjecting the web to the negative pressure maintained in the vacuum chamber or suction nozzle, the table 4 is, of course, interrupted and its web supporting function is taken over by a series of closely spaced rollers 14 that form a grid over the mouth of the vacuum chamber or suction nozzle.

The rollers are transverse to the web and at least some of them are power driven in the direction to draw the web off the roll and through the machine. Since the web is held down on the rollers by suction, the traction between the driven rollers and the web is quite adequate to assure a uniform rate of travel of the web at whatever speed the rollers are driven.

In accordance with the skin packaging technique which this invention follows, the web material is either inherently porous or air permeable, or is specially made so. Hence, the suction applied to its underside as the web passes over the vacuum chamber or suction nozzle draws the thermoplastic covering film tightly over the articles or products and against the web.

As is well known in the art, some of the previously identified thermoplastic materials in the molten state will adhere to the naked surface of ordinary paperboard stock, such as that known in the trade as "patent coated." This paperboard is only lightly calendared so as to preserve its inherently porous, gas-permeable nature. Its face or top layer is composed essentially of virgin pulp and high grade waste free of ground wood, and presents an attractive finish and appearance.

Where the chosen thermoplastic material is of the type that does not adhere readily to the naked surface of paperboard stock, the board is coated or suitably treated with an adhesive which has an affinity for the chosen thermoplastic. One example of the practice will be found in the Groth U.S. Pat. No. 2,855,735.

In any event, after the web crossed the vacuum chamber or suction nozzles, the covering film should be securely adhered to it, and with this accomplished, only one operation remains to be performed by the machine. The web, with its plastic covered articles or products thereon, must be severed transversely between the successive articles or products thereon, to form separate units or pieces, each of which constitutes a complete package. This is done by a flying guillotine-type knife 15 located at the discharge end of the machine. A carrier 16 mounts the knife for up and down movement and the carrier rides on horizontal rails 17 that are fixedly secured to the frame of the machine. Suitable drive mechanism (not shown for sake of clarity) effects reciprocation of the carrier along the rails 17, and imparts up and down motion to the knife, in proper timed relation with the advance of the web.

If desired, a punch can be operated along with the knife, to provide a hanging hole in each package as it is cut from the web, and by the same token, the knife can be shaped to impart any desired configuration to the edges of the package.

Also, as well be readily understood, one or more slitting couples can be provided to slit the web into two or more stripes before it reaches the flying guillotine knife 15. The provision of such slitters permits forming a plurality of packages with each operation of the flying guillotine knife, by simply loading the articles or products in side-by-side relation across the width of the web.

THE RESIN HANDLING SYSTEM

Figure 1:
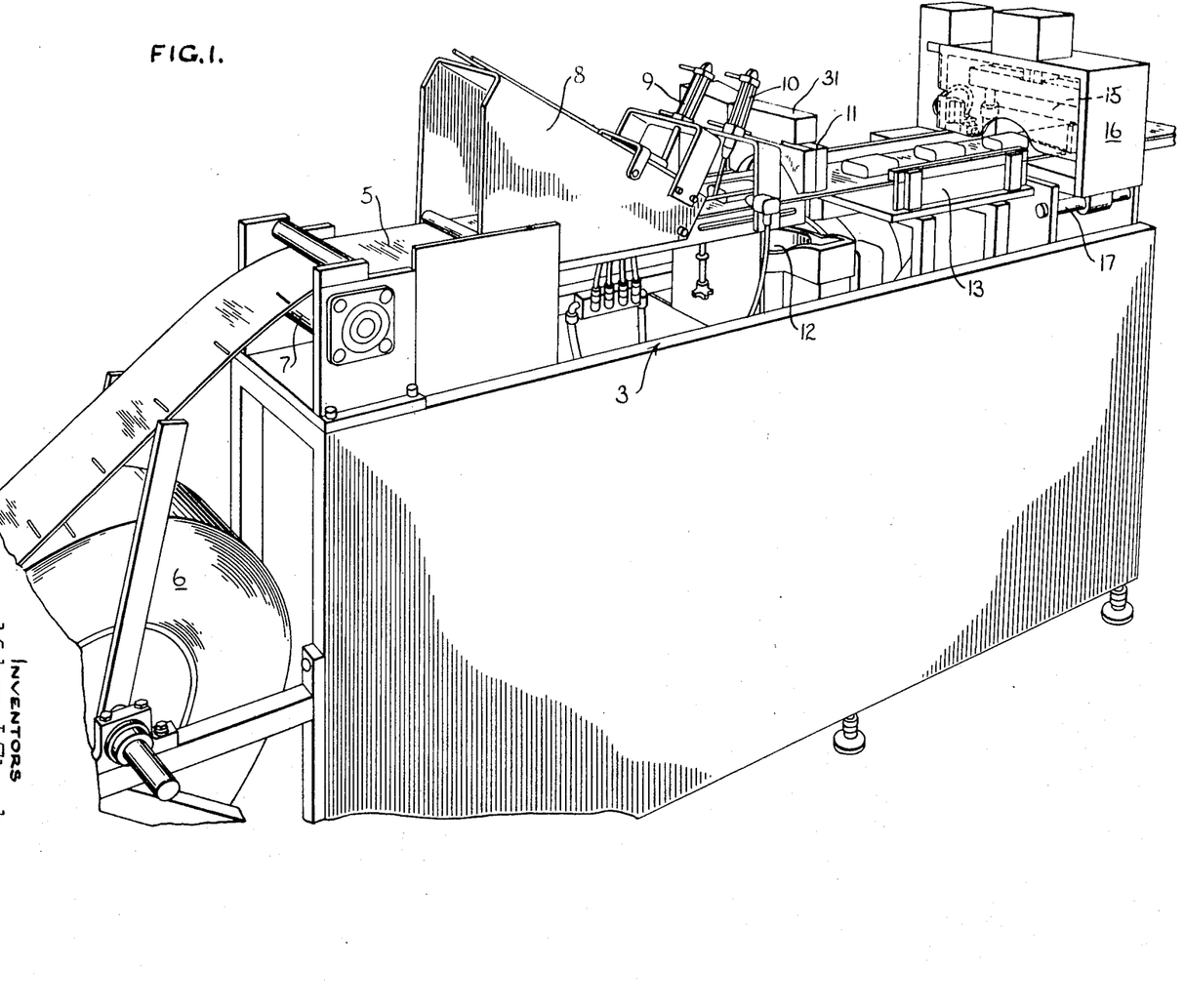
FIG. 1 is a perspective view of the front side of the machine, viewing the same from its loading end.
Figure 2:
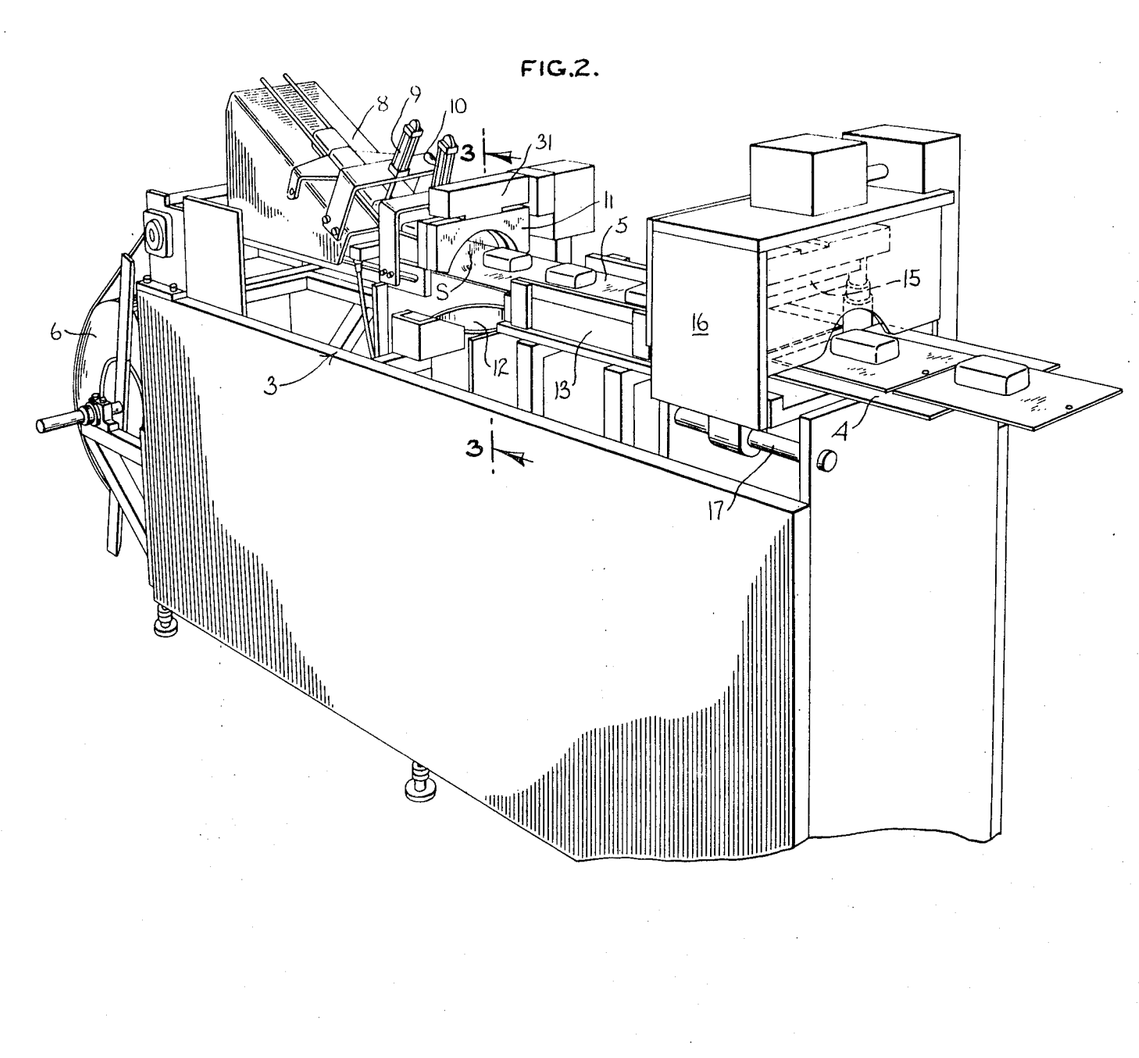
FIG. 2 is a perspective view of the same side of the machine taken from its discharge end.
Figure 3:
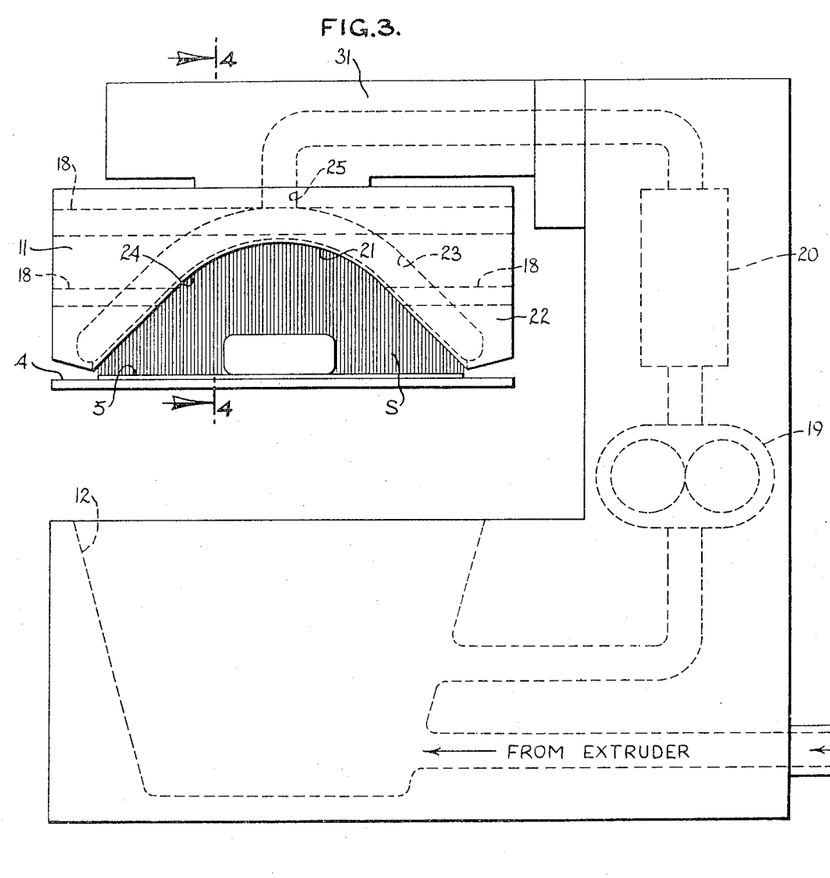
FIG. 3 is a cross sectional view through the machine on the plane of the line 3—3 in FIG. 2.
Figure 4:
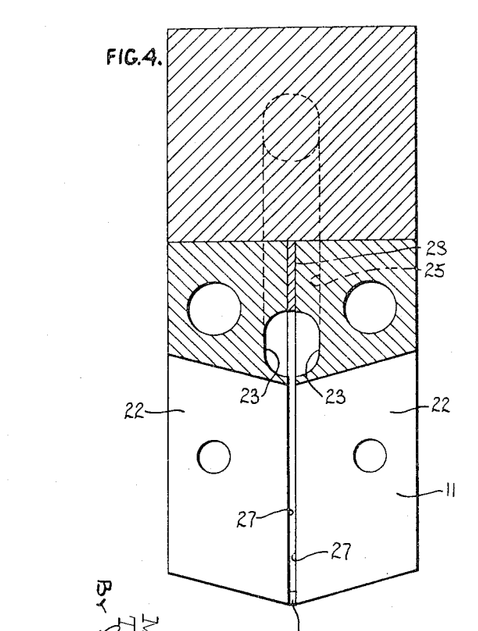
FIG. 4 is a cross sectional view through the curtain forming nozzle, on the plane of the line 4—4 in FIG. 3.

As best seen in FIG. 3, and as briefly mentioned before, a melt tank or pot 12 located beneath the nozzle 11 catches the descending curtain of molten plastic material whenever there is no substrate under the nozzle. The tank or pot, like the nozzle, is heated to keep the material molten. Electric heating elements 18 inserted into bores or pockets in the walls of the nozzle and the pot provide a convenient heat source for this purpose. Obviously, of course, these heating elements are connected with a current source and are appropriately controlled to maintain a predetermined temperature, but for sake of clarity these details are not shown in the drawings.

During operation of the machine, a pump 19 diagrammatically illustrated in FIG. 3, draws molten thermoplastic material from the melt tank or pot and delivers it under pressure to the nozzle 11, it being understood that the ducts through which the material reaches the nozzle are suitably heated, and preferably the material is passed through a deaerator 20 like that of the Chenoweth Pat. No. 3,299,195 in its passage to the nozzle.

The system is kept supplied with thermoplastic material by periodically introducing fresh material into the melt tank or pot 12 by means of a conventional extruder, not shown, which as is customary, has a hopper to recieve the additional material, and also serves as a pre-melter so that by the time the fresh material reaches the melt tank it is almost in its molten state.

Figure 5:
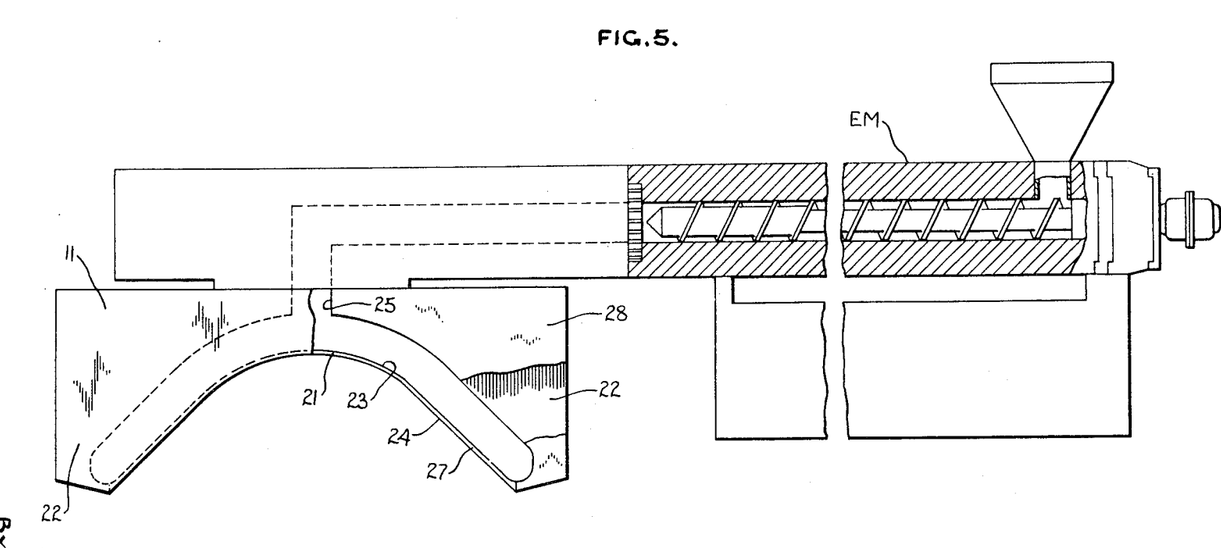
FIG. 5 is a view similar to FIG. 3, but showing an alternate way of delivering the molten thermoplastic material to the nozzle.

As an alternate for the material supply system just described, the more direct arrangement illustrated in FIG. 5 may be employed. In this system there is no pump and no melt tank. Instead, an extruder-melter unit EM converts the pelletized material that is loaded into the hopper of the unit into molten thermoplastic material and forces it into and from the nozzle. It is to be understood that the ducts leading to the nozzle are suitably heated and that the flow of molten plastic material to the nozzle can be terminated, if desired, by either stopping the extruder or providing a valve controlled by-pass for the material leaving the extruder. Since no melt tank or collecting hopper is employed in the alternate system, it is to be understood that no material would be delivered to the nozzle until the web has been started through the machine and was traveling under the nozzle.

THE EXTRUSION NOZZLE

The most significant aspect of the nozzle is the arched or concave shape of its bottom edge in which the mouth 21 of the nozzle is located. The nozzle mouth is a slit which extends for practically the entire length of the nozzle. Because of the arched or concave shape of the nozzle mouth its ends can be located quite close to the level of the table over which the web substrate travels, while the medial or middle portion thereof is spaced far enough above that level to permit unrestricted passage of the articles or products being packaged.

Figures 7, 8, 9:
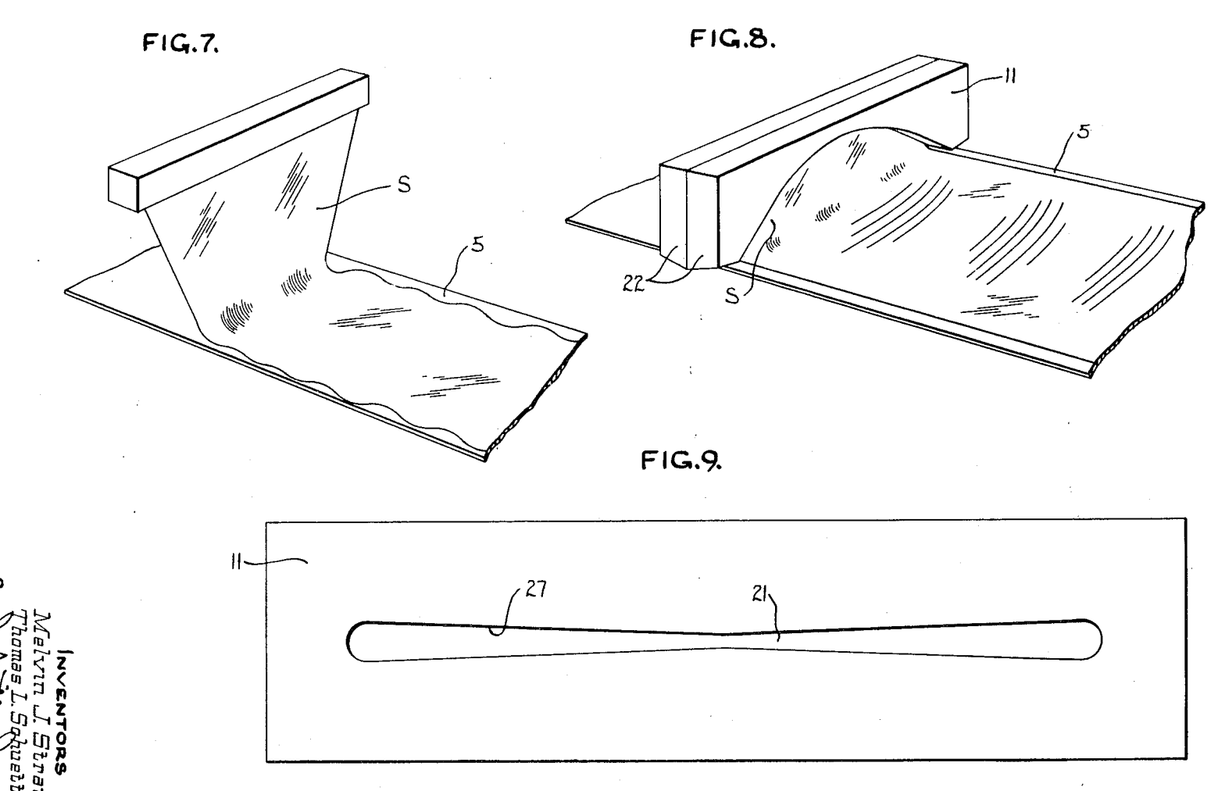
FIG. 7 is a perspective view showing a curtain or sheet of liquid resin issuing from a conventional slit-type discharge nozzle and illustrating the necking that occurs as the curtain descends and the irregular edges of the applied film that are caused by the necking.
FIG. 8 is a perspective view showing a curtain or sheet of liquid resin issuing from the nozzle of this invention, but without the benefit of its feature that eliminates the cascading problem, and showing the effects of cascading on the covering film laid onto the traveling substrate.
FIG. 9 is a bottom view of the discharge nozzle illustrating in an exaggerated manner one way in which the velocity of the material issuing from the nozzle can be controlled to eliminate the cascading problem.

Because of the close proximity of the ends of the nozzle mouth to the level of the table, the thermoplastic material issuing therefrom has but a very short distance to travel before it impinges the web. Accordingly, the descending curtain reaches its destination, i.e. the passing web and the articles or products thereon, without being affected by the necking which characterizes falling curtains or sheets of liquid resin, and which is illustrated in FIG. 7. In fact, the curtain or sheet which debouches from the nozzle mouth 21 is practically devoid of necking, and because of this the side edges of the curtain do not waver toward and from one another. Accordingly the edges of the deposited film are straight and directly contiguous to the edges of the web, as shown in FIG. 8. Obviously, of course, for this desired contiguity to exist, the nozzle dimensions must comport with the width of the web.

The specific shape of the arch or concavity defined by the bottom edge of the nozzle while subject to modification, has been found to be very effective if the side portions of the arch are straight and at an angle of about 45° to the horizontal for a substantial distance and the medial or upper portion thereof has a compound curvature. With this formation the included angle between the straight side portions of the arched nozzle is 90°.

Figure 6:
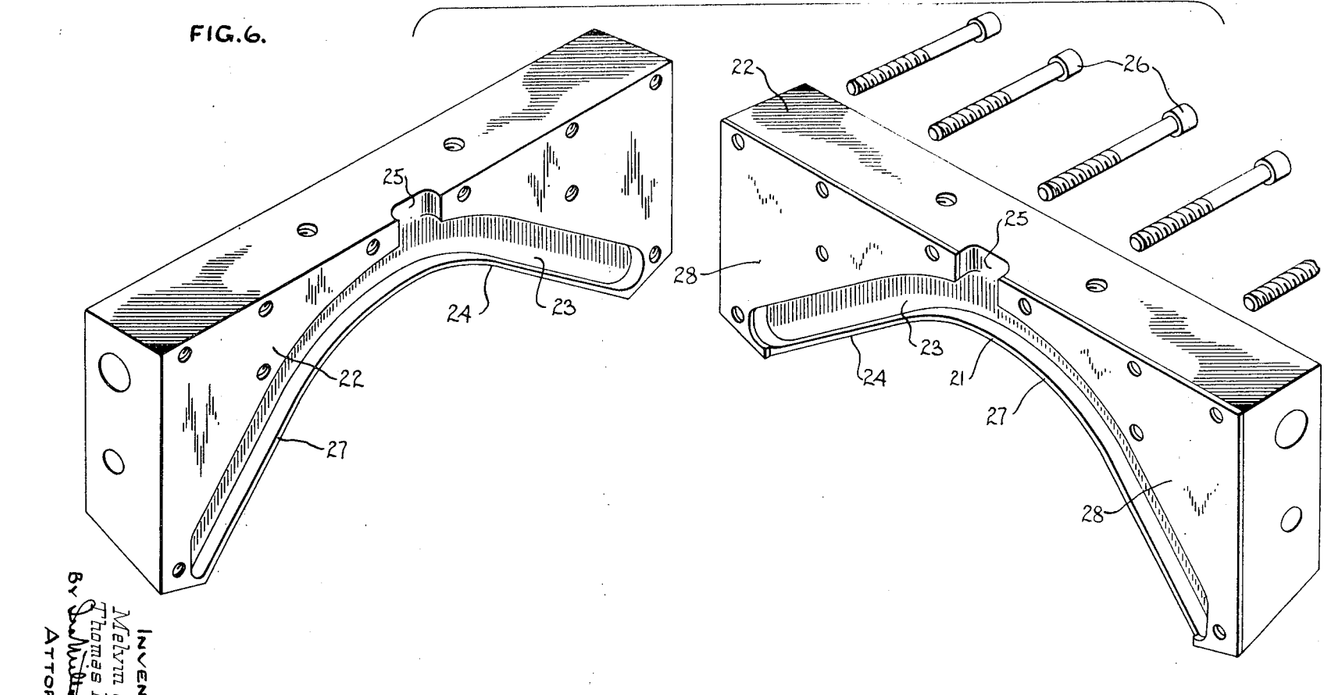
FIG. 6 is a perspective view of the two plates which together form the curtain forming nozzle, the plates separated to illustrate their inner mating faces.

The nozzle is formed by joining two plates 22 which, as best seen in FIG. 6, are mirror images of one another. The mating inner faces of these plates have grooves 23 above their bottom edges 24 and leading from a groove 25 which opens to the top edge of the plates. Thus when the plates are secured together, as by cap screws 26, the grooves coact to provid a manifold passage which leads from an inlet formed by the grooves 25 to the mouth 21 of the nozzle.

The mouth of the nozzle is a slit between the lower edge portions or lands 27 of the plates which is that part thereof between the grooves 23 and the bottom edges of the plates. If the plates are in direct surface-to-surface engagement, it is of course necessary that the lands 27 be at a level below that of the remaining flat inner faces of the plates in order to provide the slit.

Alternatively shims 28 of a size and shape to cover all but the lower edge portions 27 of the plates, can be clamped therebetween. The use of shims without also cutting the lands 27 below the plane of the flat faces of the plates will result in a nozzle mouth of uniform width for its entire length.

To obtain the needed differential in velocity of the material issuing from the nozzle so that the flow is slower from the medial portion of the nozzle mouth than it is at the end portions of the nozzle mouth, one of several things must be done. With or without the shims 28, the lands 27 can be cut to a progressively deeper level below the plane of the flat inner face of the plates, so that the slit which forms the mouth is wider at its ends than at its middle as shown in an exaggerated way in FIG. 9, where—for sake of clarity—the nozzle appears as a monolith. This difference in width of the nozzle mouth results in a greater flow capacity at the ends than at the middle of the nozzle mouth; and as a consequence the velocity of the material debouching from the middle portion of the nozzle mouth is less than it is at the ends.

Figure 10:
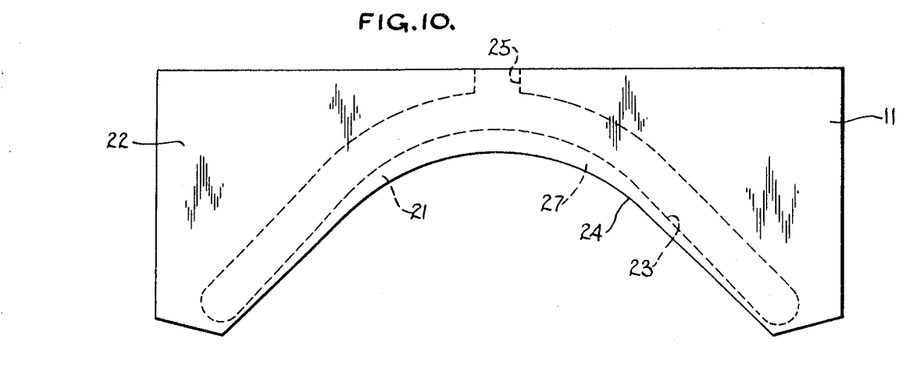
FIG. 10 is a front view of the nozzle illustrating another way of gaining a differential in the velocity of the material issuing from the nozzle at different locations along the length thereof to eliminate the cascading effect.

The same differential flow capacity and resultant velocity difference can be obtained with a uniform width slot, by making the lands 27 wider at the center than at the ends of the slot, as shown in FIG. 10, also in an exaggerated way.

Figure 11:
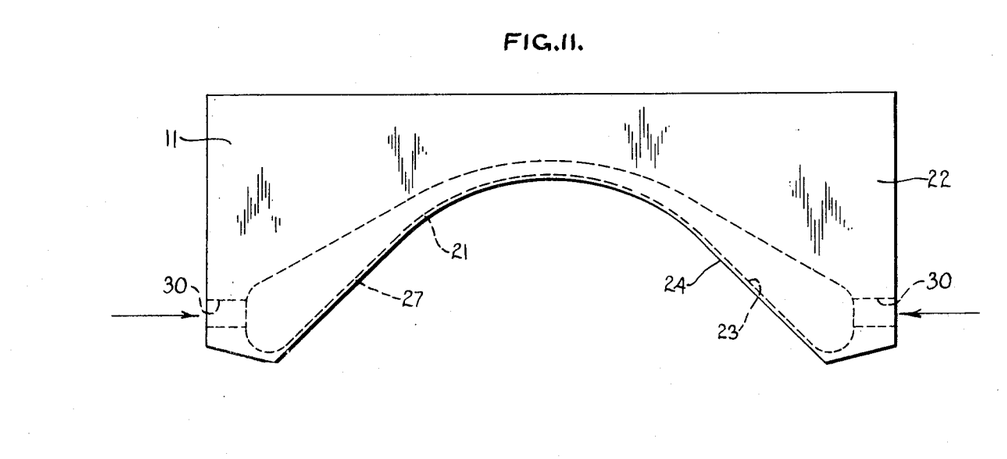
FIG. 11 is a front view of the discharge nozzle illustrating still another way of achieving a reduced velocity for the material issuing from the middle portion of the nozzle as compared to the velocity of the material leaving its end portions.

Another way of gaining the needed velocity differential as illustrated in FIG. 11, involves bringing the liquid resin simultaneously into both ends of the manifold formed by the grooves 23, through inlet ports 30, and having the manifold-forming grooves progressively smaller in cross section from both ends thereof towards the middle.

Still another way of achieving the desired velocity differential is to employ two sources of molten resin, one at a higher temperature, and hence lower viscosity, than the other. The latter is introduced into the central portion of the manifold and the lower viscosity material into the ends of the manifold.

Whichever approach is used to gain the needed velocity differential, the important consideration is that the velocity of the material issuing from the middle portion of the nozzle mouth must be sufficiently slower than that which issues from the ends thereof to assure that the velocity of the flowing material will be uniform across the entire width of the curtain at the moment the film forming material contacts the web and the articles or products thereon. With such uniform impingent velocity, cascading can be prevented by simply adjusting the rate of travel of the web.

The specific structure by which the nozzle 11 is supported and connected with the pump is a matter of design and not important to this invention, but for sake of completeness of the disclosure, the connected plates 22 are bolted to the underside of an arm 31 which in turn is supported on an upright pedestal, both of which units are provided with the passages necessary to conduct the material from the pump to the nozzle, and one of them may contain the deaerator 20.

Figure 19:
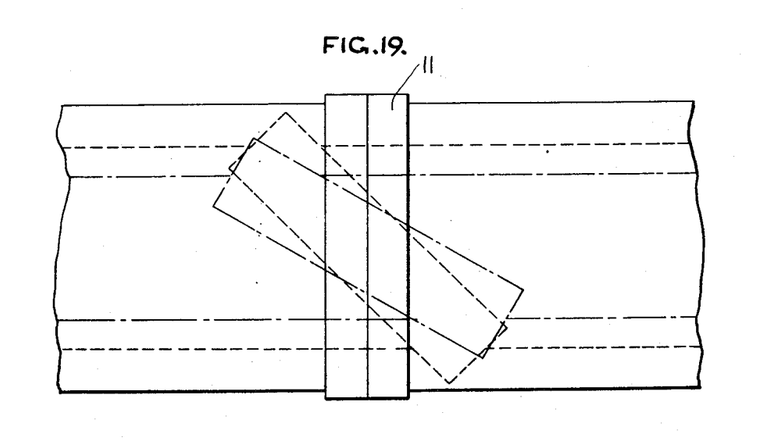
FIG. 19 is a more or less diagrammatic top view of that portion of the machine at which the plastic extrusion nozzle is located, to illustrate how a single nozzle can be adapted to substrate webs of different width.

With the nozzle mounted in a manner just described, a change in width of the web entails removal of the nozzle and replacement thereof with one that is correct for the different web width. However, by mounting the nozzle as shown in FIG. 19 so that it can be rotated or swivelled about a vertical axis passing through the inlet to the nozzle, a nozzle of a size that is correct for the widest web handled by the machine can be swung to a position oblique to the path of the web. This enables adjusting the effective width of the descending curtain to a narrower web. Thus by that simple adjustment, the machine can be adapted to webs of different width.

THE VACUUM CHAMBER OR SUCTION NOZZLE

Figure 12:
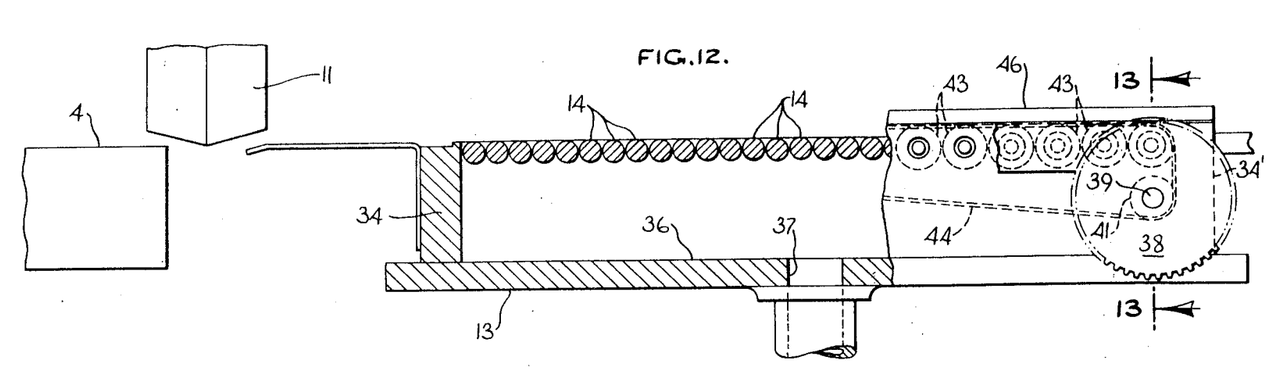
FIG. 12 is a side view of the vacuum chamber or suction nozzle by which the covering film is drawn down onto the articles or products and tightly against the substrate, with parts broken away and in section.
Figure 13:
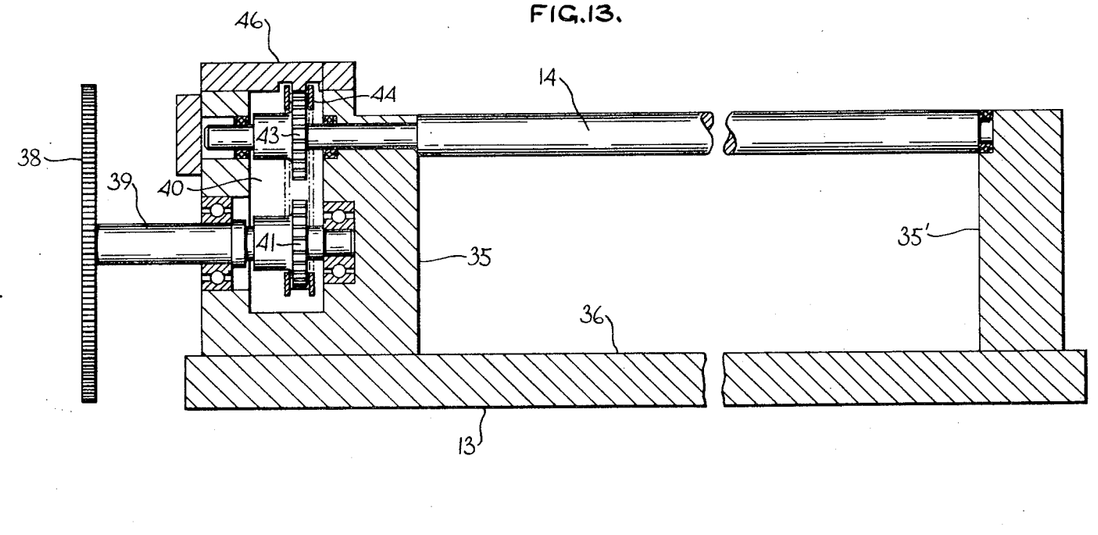
FIG. 13 is a cross sectional view through the vacuum chamber or suction nozzle, taken on the plane of the line 13—13 in FIG. 12.

(FIGS. 12 and 13)

The vacuum chamber or suction nozzle 13 is essentially a rectangular pan with end walls 34–34', side walls 35–35', and a bottom wall 36, the latter having a port 37 through which the chamber is connected with a source of suction, now shown. Across the top of the pan is the grid formed by the series of closely spaced rollers 14. The ends of these rollers are journalled in the side walls 35–35' at a level such that their peripheral surfaces are tangent to the plane of the table 4. Collectively, therefore, the tops of the rollers form a continuation of the table.

In the structure illustrated every other roller is driven in the direction to draw the web through the machine. The drive for the rollers may be provided by any suitable variable speed prime mover, as for instance, an adjustable speed electric motor or a variable speed hydraulic motor, but whatever form of prime mover is employed, it is drivingly connected with a gear 38 that is secured to a stub shaft 39 journalled in the side wall 35. The wall 35 is hollow and provides a transmission chamber 40 through which the shaft 39 extends, and inside this chamber the shaft 39 has a sprocket 41 fixed thereto.

Every other roller 14 has an extension of its shaft extending across the chamber 40 and provided with a sprocket 43. All of the sprockets 43 are aligned with one another and with the sprocket 41 and a chain 44 meshes with all of the sprockets to transmit driving torque from the shaft 40 to all of the driven rollers. As seen in FIG. 13 a removable cover 46 which closes the top of the transmission chamber, holds the chain 44 in meshing engagement with all of the sprockets 43, and tough not shown, an adjustable idler may be provided if necessary to keep the chain taut.

By driving only every other roller, the sprockets 43 can be larger in diameter while at the same time the space between adjacent rollers can be held to a bare minimum.

If it is desired to drive all of the rollers, the illustrated and described drive mechanism can be duplicated at the opposite side of the vacuum chamber. In this case half the rollers would be driven from one end thereof and the other half from the opposite end.

As will be readily understood, the negative pressure maintained in the vacuum chamber or suction nozzle, acting through the inherently porous substrate, or specifically produced "porosity" of the substrate, evacuates any space between the substrate and the covering thermoplastic film as the web crosses the chamber, and at the same time assures good traction between the drive rollers and the web.

The adjustability of the drive for the rollers enables the rate of advance of the web to be properly coordinated with the velocity of the falling curtain to assure the attainment of a fine appearing package in which the transparent plastic film tightly hugs the packaged article or product and all portions of the film are smooth and free from the effects of cascading.

As noted hereinbefore, after the web with the plastic covered articles or products thereon crosses the suction chamber it is cut transversely by the flying guillotine knife 15 whereupon the packages are complete and can be taken from the machine in any desired manner. Since this flying guillotine is quite conventional, it need not be specifically illustrated or described; on the contrary it is sufficient to note that the operation of the knife must be timed with the advance of the web and coordinated with the placement of the articles or products onto the web at the loading station of the machine.

MODIFICATIONS

The continuity which characterizes the operation of the machine of this invention, adapts it very nicely to the incorporation of optional features. One of these which is diagrammatically illustrated in FIG. 14, enables perforation of the web to render an otherwise impervious web, air permeable. This can be done by having the web pass between the perforating roll 50 with many sharp pins projecting therefrom, and a bed roll 51 which has a rubber surface. The location of this perforating couple can be anywhere upstream of the loading station.

Among optional feature, provides for seal coating the underside of the web after it leaves the vacuum chamber or suction nozzle. As diagrammatically shown in FIG. 15, this can be done by an applicator roll 53 positioned to contact the underside of the web and to have a coating substance transferred to it by a transfer roll 54 which in turn dips into a bath of the coating material maintained in a pan or fountain 55.

Figure 14:
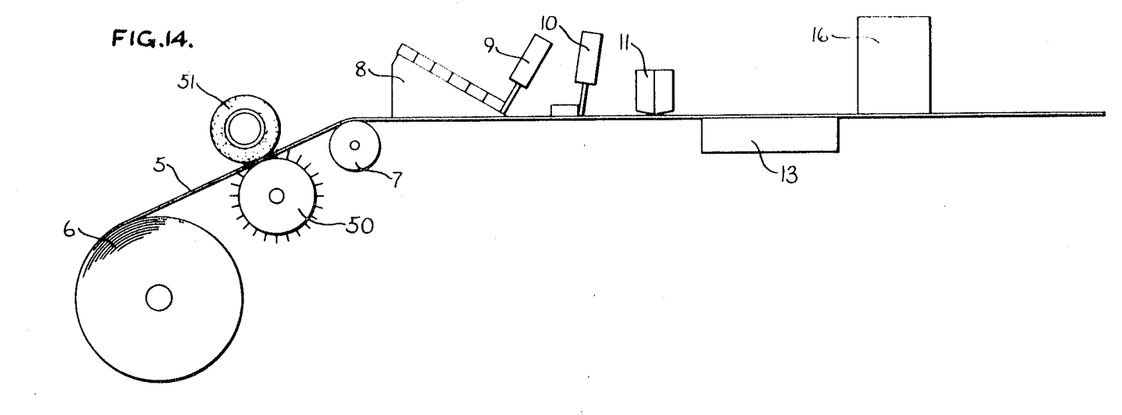
FIG. 14 diagrammatically illustrates the adaptation to the machine of a web perforating device by which an otherwise impervious web can be rendered air permeable.
Figure 15:
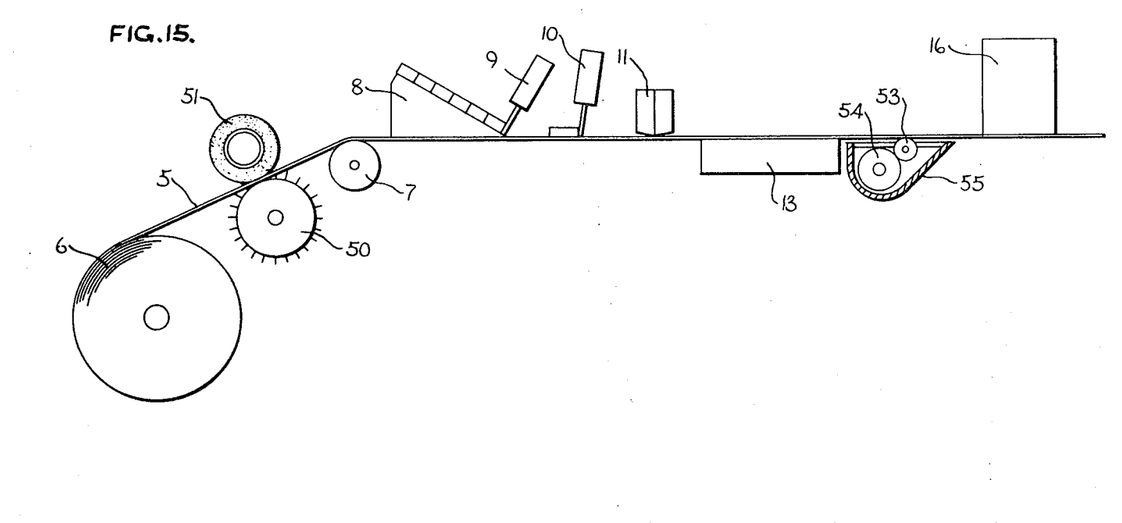
FIG. 15 diagrammatically illustrates one way in which the machine can be equipped with a seal coating to enable the underside of the substrate to be sealed.

Seal coating the underside of the web may be especially desirable if perforated material is used for the substrate, so that where the perforating fixture of FIG. 14 is employed it would be advantageous to also equip the machine with the seal coater, the combination being shown in FIG. 15.

Figure 16:
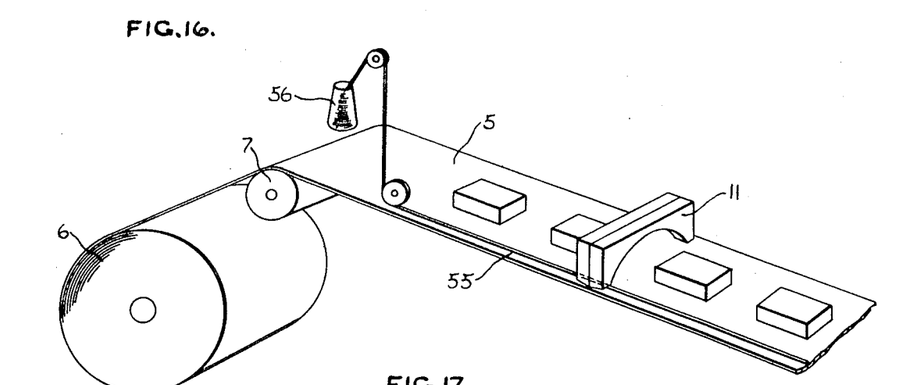
FIG. 16 diagrammatically illustrates a modification of the machine to incorporate a tearstrip or cord in the packages.

To facilitate opening the formed packages, a tear strip or cord 56 can be incorporated in each package. This requires only providing a supply of the strip or cord material as indicated at 56 in FIG. 16, and feeding the same onto the web before the web reaches the curtain forming nozzle. The location of the tear strip or cord transversely of the web would of course depend upon the nature and size of the article or product being package; and to facilitate grasping an end of the strip or cord, the cut-off knife can be shaped to form a tab in line with the strip or cord either on the leading or trailing edge of the packages as they are formed.

Figure 17:
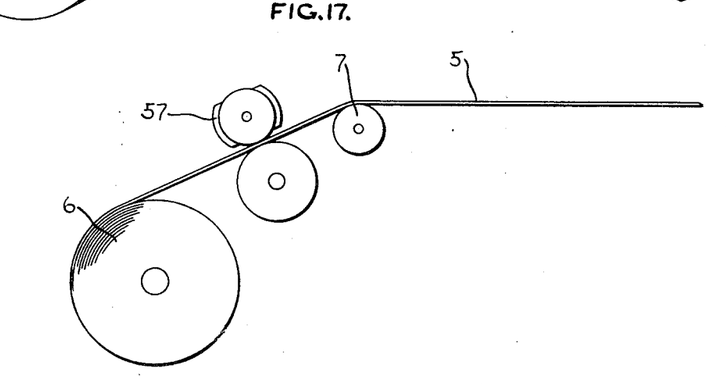
FIG. 17 diagrammatically illustrates the optional incorporation of a die cutter by which the substrate may be die cut to provide for easy opening of the packages.

It is also possible to equip the machine with a die cutter 57 as shown in FIG. 17, by which the web can be slit to provide a freely displaceable tab to facilitate opening of the package.

While it is undoubtedly best from the standpoint of ease and speed of operation to supply the substrate in the form of a web drawn continuously off a roll, the significant advantages and improvements of the invention are not limited to the use of a web, but can also be utilized if the substrate consists of discrete cards or styrofoam cradles fed successively into the machine. In this case it would of course be necesary to provide a conveyor to carry the individual cards or cradles through the machine, but of course only to the cut-off knife.

Figure 18:
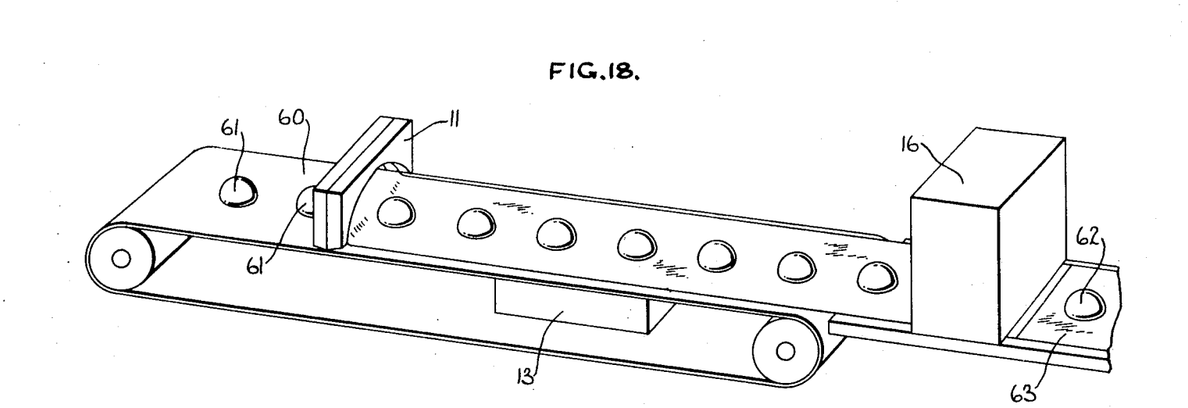
FIG. 18 diagrammatically illustrates a modification to the machine to adapt it to making plastic blisters for use in packaging materials or products that cannot very well be packaged by the skin packaging technique.

As shown in FIG. 18, it is also possible to adapt the machine to the production of plastic blisters which can be adhered to cards to form packages for materials and products that do not lend themselves to being packaged by the skin-packaging technique. For this purpose, an endless belt conveyor 60 of a suitable gas-pervious material to which the thermoplastic material does not adhere, carries molds 61 through the machine and to the cutoff knife.

The molds 61 which are also of material to which the plastic material does not adhere, may be deposited on the conveyor in the same way the articles or products are loaded onto the traveling substrate web, and as they pass under the nozzle the curtain of molten thermoplastic material issuing therefrom lays itself onto the molds and the surrounding surface of the conveyor to be drawn tightly about the molds and against the conveyor by the vacuum chamber. The result is a plastic ribbon with integral blisters of a shape defined by the molds. Since the plastic film does not adhere to the conveyor, it continues smoothly beyond the discharge end of the conveyor and into the cutoff knife by which it is supported as it is cut into separate units, each of which comprises a blister 62 of a shape determined by the mold over which it was drawn and an encircling flat flange 63. The molds either drop out of the blisters as the separate units leave the machine, or are easily removed therefrom with the result that the separate units may be used in blister packaging by adhesively securing their flanges to carrying cards.

It will also be apparent that in addition to providing an improved packaging machine, the invention encompasses a new method of (1) utilizing the skin packaging technique (2) coating a surface of a substrate with a plastic film that is uniformly thin and smooth across the entire area of the coated surface and has straight side edges directly contiguous to the side edges of the substrate, and (3) forming a plastic strip having a nonplanar shape and straight side edges. This method, in its specifically different embodiments can be practiced with tools and structure other than the machine herein disclosed. The novel and characterizing steps of this method which are generic to its specifically different embodiments are:

(1) Providing an air permeable conveyor or traveling substrate;

(2) Discharging molten thermoplastic material from a downwardly facing elongated orifice that has an endwise concave shape so that its ends are at a lower elevation than its medial portion, to produce a descending curtain of the molten thermoplastic material;

(3) Laying that curtain of molten thermoplastic material onto the conveyor or traveling substrate as a form-retaining film by advancing the conveyor or substrate along a substantially horizontal path through the descending curtain;

(4) So controlling the path of the conveyor or substrate that as it passes beneath the orifice the top surface thereof is close to the ends of the orifice, so that the material forming the side edge portions of the curtain travels but a short distance before it impinges upon the conveyor or substrate;

(5) Coordinating the rate at which the conveyor or substrate passes through the descending curtain with the flow rate of the thermoplastic material forming the side edge portions of the curtain to assure that the side edge portions of the curtain lay themselves smoothly and uniformly onto the conveyor or substrate;

(6) Effecting a differential in the discharge rate of the molten thermoplastic material along the length of the orifice to cause the material to issue sufficiently slower from the middle portion of the orifice than it does from the end portions thereof so that across its full width the film is laid smoothly and uniformly onto the conveyor or substrate and has a substantially uniform thickness; and (7) Passing the conveyor or substrate with the film of thermoplastic material covering its upper surface across a source of suction to draw the film tightly down onto the conveyor or substrate.

From the foregoing description taken in connection with the accompanying drawings, it will be apparent to those skilled in this art that the machine of this invention will be a tremendous boon to the packing industry.

Those skilled in the art will appreciate that the in-

The invention can be embodied in forms other than as herein disclosed for purposes of illustration.

The invention is defined by the following claims.

What is claimed is:

1. The method of packaging, which comprises:
   (A) placing the article to be packaged upon a substrate of air permeable material;
   (B) discharging molten thermoplastic material of the type which lends itself to use in the skin packaging technique from a downwardly facing elongated orifice that has an endwise concave shape so that its ends are at a lower elevation than its medial portion, to produce a descending curtain of said material;
   (C) laying said descending curtain of molten thermoplastic material onto the substrate and the article thereon as a form-retaining film, by advancing the substrate with the article thereon along a substantially horizontal path through the descending curtain with the top of the substrate close to the ends of the orifice, so that the material forming the side edge portions of the curtain travels but a short distance before it impinges upon the substrate, whereby the side edges of the film laid onto the substrate are free from irregularity;
   (D) so coordinating the rate at which the substrate passes through the descending curtain with the flow rate of the thermoplastic material forming the side edge portions of the curtain that said side edge portions of the curtain lay themselves smoothly and uniformly onto the substrate;
   (E) effecting a differential in the discharge rate of the molten thermoplastic material along the length of the orifice to compensate for the curvature thereof and assure that despite the varying distance between the mouth of the orifice and the substrate the film across its entire width is laid smoothly and uniformly onto the substrate and the articles thereon and has a substantially uniform thickness; and
   (F) passing the substrate with the film of thermoplastic material covering its upper surface and the article thereon across a source of suction to draw the film tightly down onto the substrate and the article thereon.

2. The method of applying a plastic film to a substrate which comprises:
   (A) providing the substrate in an air-permeable form;
   (B) discharging molten thermoplastic material of the type which lends itself to use in the skin packaging technique from a downwardly facing elongated orifice that has an endwise concave shape so that its ends are at a lower elevation than its medial portion, to produce a descending curtain of said material;
   (C) laying said descending curtain of molten thermoplastic material onto the substrate as a form-retaining film by advancing the substrate along a substantially horizontal path through the descending curtain with the top of the substrate close to the ends of the orifice,
      so that the material forming the side edge portions of the curtain travels but a short distance before it impinges upon the substrate, whereby the side edges of the film laid onto the substrate are free from irregularity;
   (D) so coordinating the rate at which the substrate passes through the descending curtain with the flow rate of the thermoplastic material forming the side edge portions of the curtain that said side edge portion of the curtain lay themselves smoothly and uniformly onto the substrate;
   (E) so controlling the discharge of the molten thermoplastic material from the orifice that the material flows sufficiently slower from the middle portion of the orifice than it does from the end portions thereof to assure that across its full width the film is laid smoothly and uniformly onto the substrate and has a substantially uniform thickness; and
   (F) passing the substrate with the film of thermoplastic material covering its upper surface across a source of suction to draw the film tightly down onto the substrate.

3. The method of forming a plastic strip with straight parallel side edges and a nonplanar shape between its side edges, which comprises:
   (A) discharging molten thermoplastic material of the type which lends itself to use in the skin packaging technique from a downwardly facing elongated orifice that has an endwise concave shape so that its ends are at a lower elevation than its medial portion, to produce a descending curtain of said material;
   (B) providing an air-permeable conveyor with shape-defining formations thereon;
   (C) moving said conveyor lengthwise along a path that transversely intersects said descending curtain, to thereby cause the descending curtain to lay itself onto the top of the conveyor and the shape-defining formations thereon as an unbroken pliable film;
   (D) so defining the path of the conveyor that as it passes beneath the orifice the side edge portions of the conveyor are directly below and close to the ends of the orifice,
      so that the material forming the side edge portions of the curtain travels but a short distance before it impinges upon the conveyor whereby the side edges of the film laid onto the conveyor are straight;
   (E) so coordinating the rate at which the conveyor passes through the descending curtain with the flow rate of the thermoplastic material forming the side edge portions of the curtain that said side edge portions of the curtain lay themselves smoothly and uniformly onto the conveyor;
   (F) so controlling the discharge of the molten thermoplastic material from the orifice that the material flows sufficiently slower from the middle portion of the orifice than it does from the end portions thereof to assure that across its full width the film is laid smoothly and uniformly onto the conveyor and has a substantially uniform thickness;
   (G) causing the conveyor to travel across a source of suction that is located downstream from the orifice to draw the film while still pliable tightly down onto the surfaces of the conveyor and the shape-defining formations thereon, and thereby form the film into a plastic strip of the desired shape; and
   (H) stripping the thus formed plastic strip from the conveyor.

References Cited
UNITED STATES PATENTS

| | | | |
|---|---|---|---|
| 3,533,212 | 10/1970 | Borel et al. | 53—140 X |
| 2,364,435 | 12/1944 | Foster et al. | 264—210 R X |

ROBERT F. WHITE, Primary Examiner

J. H. SILBAUGH, Assistant Examiner

U.S. Cl. X.R.

264—177 R, 259; 425—109, 388, 564